March 16, 1926.

C. G. SANDER 1,576,552

BRUSHING MACHINE

Filed April 29, 1924

INVENTOR=
Charles G. Sander
By Coale Shay
ATTORNEYS=

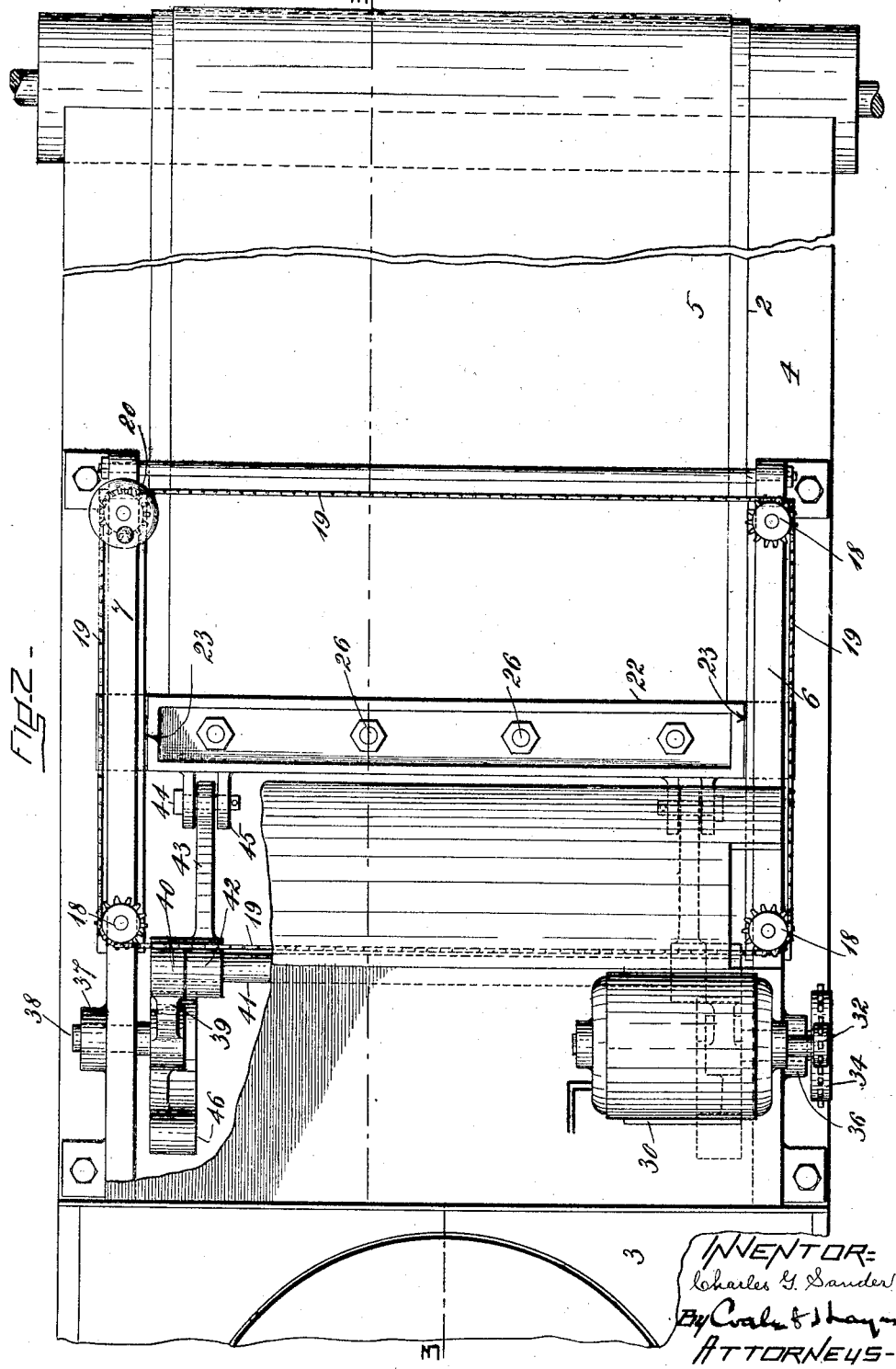

March 16, 1926.
C. G. SANDER
1,576,552
BRUSHING MACHINE
Filed April 29, 1924         4 Sheets-Sheet 3
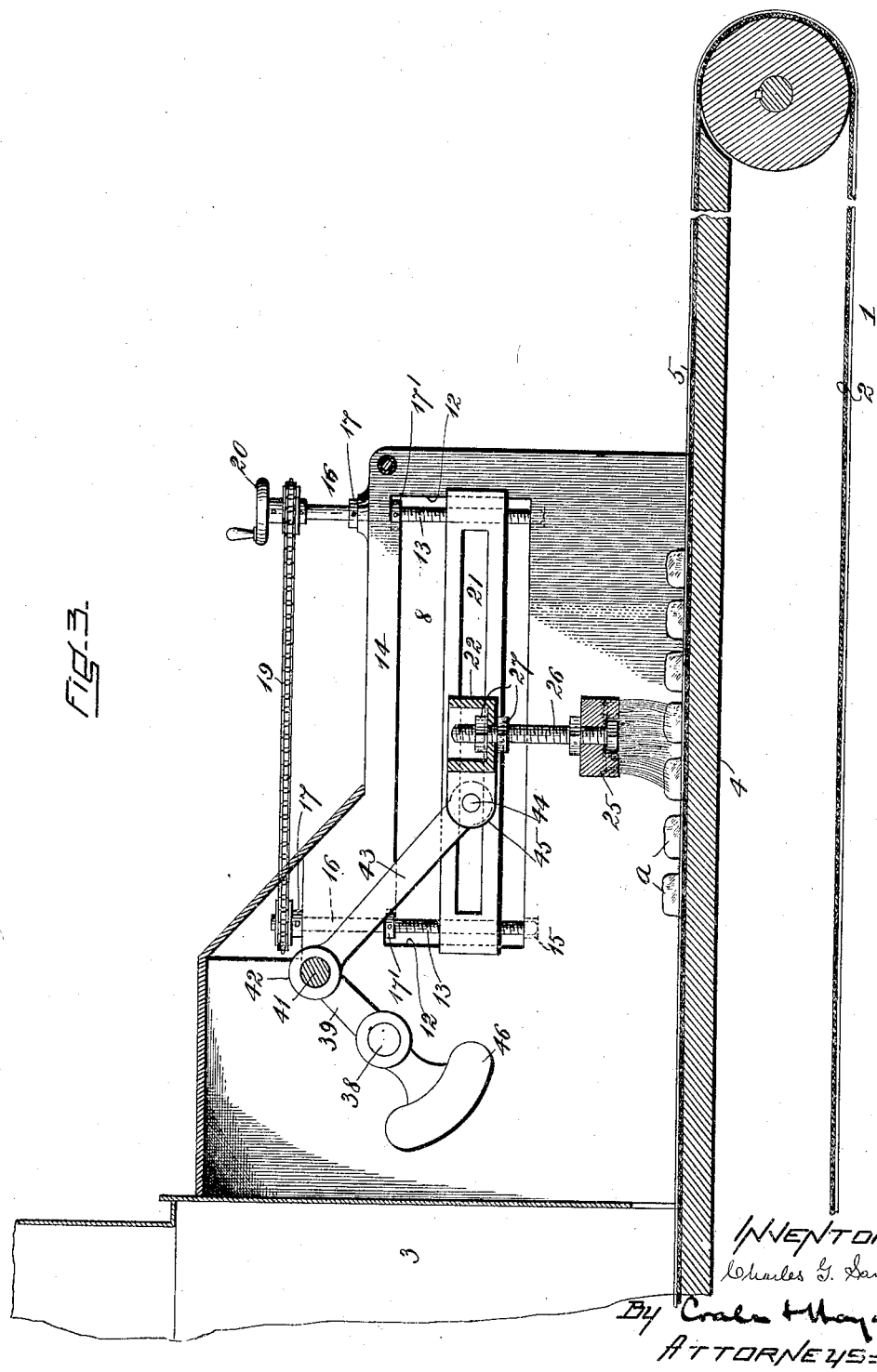

March 16, 1926.
C. G. SANDER
1,576,552
BRUSHING MACHINE
Filed April 29, 1924   4 Sheets-Sheet 4
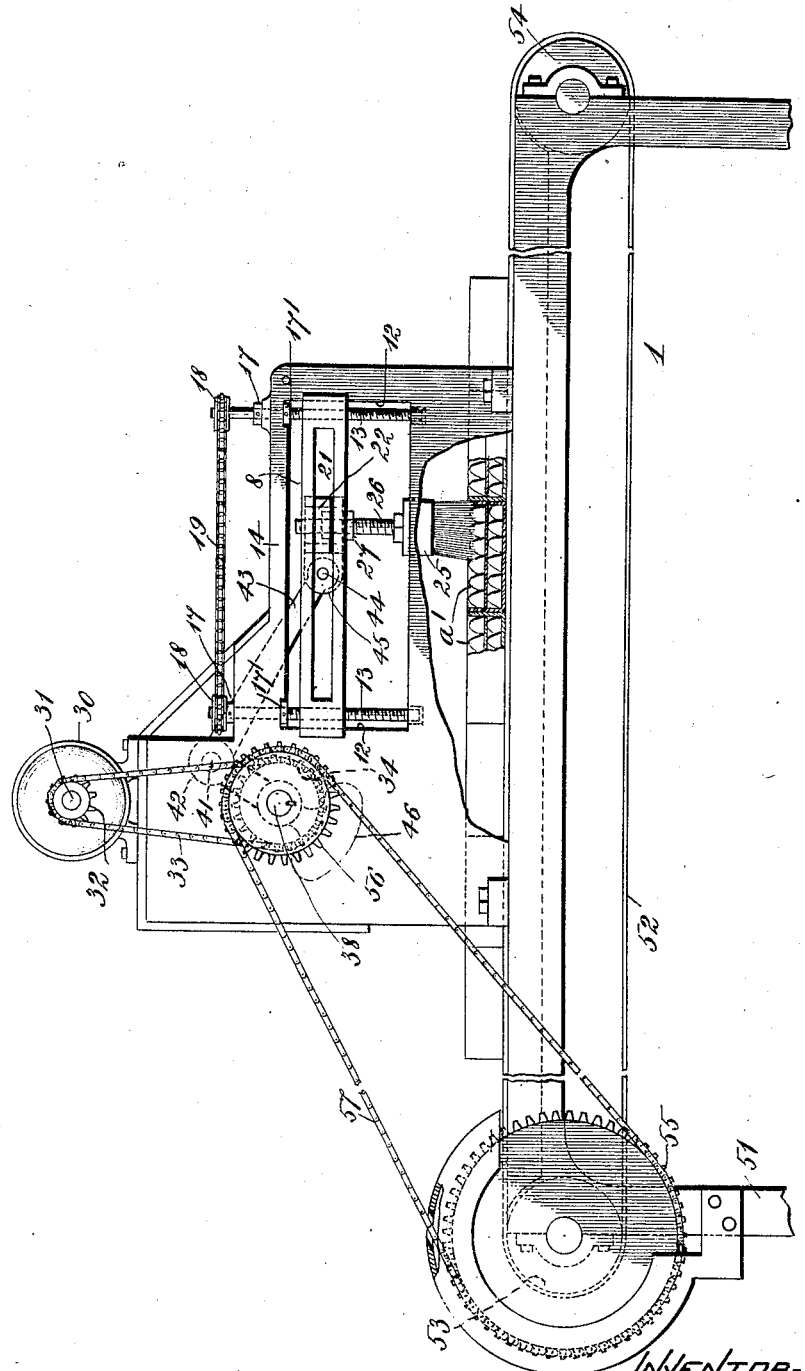

Patented Mar. 16, 1926.

1,576,552

UNITED STATES PATENT OFFICE.

CHARLES G. SANDER, OF BROOKLINE, MASSACHUSETTS.

BRUSHING MACHINE.

Application filed April 29, 1924. Serial No. 709,884.

*To all whom it may concern:*

Be it known that I, CHARLES G. SANDER, of Brookline, in the county of Norfolk and State of Massachusetts, a citizen of the United States, have invented a new and useful Improvement in Brushing Machines, of which the following is a full, clear, and exact description, reference being had to the accompanying drawings, forming a part of this specification, in explaining its nature.

The present invention relates to a brushing machine adapted for brushing chocolate-coated confections.

The object of the invention is to provide a power-operated machine by which the brushing of chocolate-coated confections may be accomplished as effectually as is now done by hand. It is a further object of my invention to provide a machine which may be operated as an attachment to the ordinary enrober or chocolate-coating machine for brushing the candy which is conveyed from such machine; also, a machine effective for brushing the top layer of candy when packed in boxes preparatory to shipment.

The invention can best be seen and understood by reference to the drawings, in which—

Fig. 2 is a plan of the same.

Fig. 3 is a section on line 3—3 of Fig. 2, and

Fig. 4 is a side elevation of the machine as adapted for brushing packed goods.

Referring to the drawings:—

Figure 1:
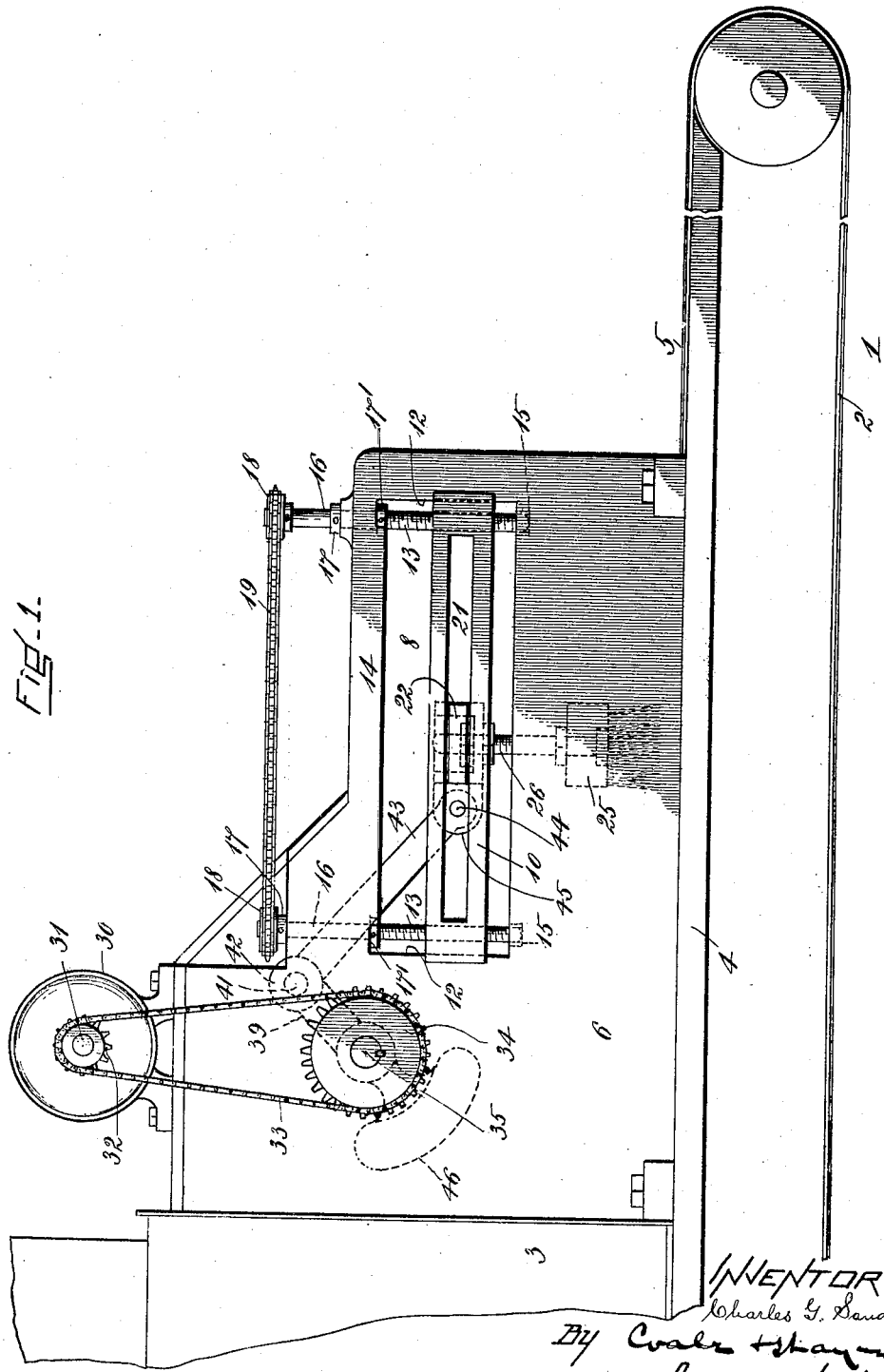
Figure 1 is a side elevation of the machine used as an attachment for an enrober or chocolate-coating machine for brushing the candy conveyed from such machine.

1 represents a conveyor consisting in part of an endless belt 2 by which chocolate-coated confections *a* are carried away from a chocolate-coating machine or enrober (not shown) and passed through a cooling tunnel 3 after which the confections are removed from the conveyor and packed.

Incident to the conveyor is a platform 4 located beneath the upper running portion 5 of the belt. This platform assists in supporting the belt and confections borne by it. Mounted upon the platform 4 and located above the portion 5 of the belt, preferably just in front of the cooling tunnel 3, is the brushing machine embodying the invention.

The frame of the machine comprises upright spaced side supports 6 and 7, respectively, arranged on opposite sides of the portion 5 of the belt and fixed by bolting or otherwise to the platform 4.

Each of the side supports 6 and 7 has in it a cut-out portion or opening 8. The openings 8 are preferably each rectangular in form and they lie opposite one another removed some little distance above the plane of the portion 5 of the belt. In each of these openings is arranged a vertically adjustable guide 10. The opposite ends of these guides are preferably grooved by which they may be retained to move up and down on the edge portions 12 of the side supports at the opposite ends of the openings 8 therein within which the guides are contained. The guides are otherwise supported by means of screws 13 on which they are arranged. These screws are passed downwardly through the parts 14 of the side supports which lie above the openings 8 therein and thence through said openings and opposite ends of the guides, the bottom ends of the screws being extended to lie and turn within sockets 15 formed in the side supports at the bottoms of the respective openings 8. That part 16 of each of the screws or shank which extends through the part 14 of the side supports turns loosely therein and is maintained against endwise movement by means of spaced collars 17, 17' thereon which engage, respectively, the top and under sides of the part 14. Those portions of the screws which extend through the openings 8 and through the ends of the guides are threaded so that as the screws are turned on the side supports the guides will be adjustably moved up or down depending upon the direction the screws are turned, or maintained by the screws at any determinate point of adjusted position.

To the end that all of the screws may be turned together for obtaining a precise simultaneous adjustment of both guides, the shank 16 of each of the screws is extended upwardly and carries upon its end a sprocket wheel 18. Around the sprocket wheel 18 for the entire set of screws a sprocket chain 19 is wrapped and the screws are turned by an application of power to this chain through a crank 20 arranged upon the top end of the shank to one of the screws. The turning of this crank in one direction or the other will have the effect of moving the guides up or down in the respective openings in which they are contained, thereby imparting a precise adjustment to both guides and admitting of their being maintained after such adjustment in any precise determinate adjusted position.

The guides 10 are each provided with a slot 21. These slots for the respective guides lie parallel with one another in substantially the same plane and extend in directions parallel with the running portion 4 of the belt.

Supported by the guides 10 and arranged to slide within the slots 21 therein is a brush carrier comprising a cross bar 22. This bar is preferably made as shown of angle iron, U-shape in form, the ends of the bar being incised to fit and slide within the slots 21 in the respective guides and provide shoulders 23 engaging the inner sides of the guides, respectively, for preventing endwise displacement of the bar.

25 is a brush borne by the carrier bar 22. The brush is preferably provided with a number of threaded handles 26 which extend upwardly through the bar 22 and are secured rigidly to it by means of nuts 27 which engage the bar on opposite sides thereof, by which means the handles are held securely in place.

With the parts thus arranged the brush may be maintained at any point of adjusted position to have any precise engagement with the confections $a$ to be treated carried by the conveyor, the slots 21 in the respective carriers permitting of the cross bar 22 and brush carried by it being reciprocated in reverse directions with the usual brushing motion.

The reciprocation of the cross bar and brush carried by it is effected as follows:—

Mounted upon the side support 6 of the frame is a motor 30 having a driven shaft 31 carrying a sprocket wheel 32. This wheel has driving connection through a sprocket chain 33 with a sprocket wheel 34 mounted upon a stub shaft 35 journaled to turn in a bearing 36 on the side 6 of the frame. Arranged precisely opposite the shaft 35 and journaled to turn in a bearing 37 on the side 7 of the frame is a stub shaft 38. Connected to each of the shafts 35 and 38 is an arm 39 having at its outer end a hub 40 arranged to turn freely upon a rod 41 common to both hubs. Mounted also to turn freely on the rod 41, each through a hub 42, are links 43 pivotally connected each by a pin 44 to lugs 45 on the brush carrier or cross bar 22.

With the parts thus arranged the brush carrier 22 will be reciprocated backward and forward within the guides 10 as the motor is driven and the brush will consequently engage the confections with a brushing motion as they are conveyed along by the conveyor belt, the reciprocating action of the motor-driven brush in practice being much faster than the movement of the conveyor belt.

In order to prevent the crank arms 39 and links 43, which connect with the brush carrier 22, from occupying a position of dead centre when the motor is started, there is preferably located upon the stub shaft 35 of the driving mechanism a counterbalancing weight 46 which operates to maintain the arms and links in a normally flexed or bent position in relation to each other.

In Fig. 4 there is shown a further adaptation of the machine in that it is applied to the brushing of packaged confections $a'$. According to this adaptation of the machine there is provided an endless conveyor on which the packaged goods are conveyed to be acted upon by the brush. This conveyor is driven by the motor 30 which operates the brush. In further detail the construction comprises a supporting frame 51 upon which is mounted an endless conveyor belt 52 which renders around spaced pulleys 53 and 54 journaled to turn on the frame 51 through suitable bearing connections. In operative connection with the pulley 53 for driving it and the endless conveyor belt 52 is a sprocket wheel 55 in operative engagement with a sprocket 56 on the shaft 35 through a connecting sprocket chain 57. The operation of the brush is precisely the same as before, the only difference in the present construction being that the conveyor which carries the confections $a'$ is driven by the motor 30 which operates the brush as differentiated from the construction first described where the conveyor forms part of the enrober or chocolate-coating machine with which the brush is associated as an attachment.

Having thus fully described my invention, I claim and desire to secure by Letters Patent of the United States:—

1. In a machine of the type specified, the combination comprising spaced upright side supports, a set of spaced adjusting screws on each of said supports, means for arranging the screws whereby they will turn on said supports without endwise movement, guides mounted upon each of said sets of screws and through which guides the threaded bodies of the screws extend, a brush, a brush carrier interposed between said guides and connecting therewith to be slidable thereon, and means connecting with the brush carrier for reciprocating it on said guides.

2. In a machine of the type specified, the combination comprising spaced upright side supports, a set of spaced adjusting screws on each of said supports, means for arranging the screws whereby they will turn on said supports without endwise movement, guides mounted on each of said sets of screws and through which guides the threaded bodies of the screws extend, means connecting with the respective screws whereby the screws may be simultaneously and uniformly turned, a brush, a brush carrier interposed between said guides and connecting therewith to be slidable thereon, and means connecting with the brush carrier for reciprocating it on said guides.

3. In a machine of the type specified, the combination comprising spaced upright side supports, each with an opening in it, a set of spaced adjusting screws on each of said supports having threaded bodies extending through the opening in the support, means for arranging the screws whereby they will turn on said supports without endwise movement, guides arranged within the respective openings of the side supports and mounted upon the threaded bodies of the respective sets of screws, a brush, a brush carrier interposed between the guides and connecting therewith to be slidable thereon, and means connecting with the brush carrier for reciprocating it on said guides.

4. In a machine of the type specified, the combination comprising spaced supporting fixtures with openings therein, slotted guides located within said respective openings and adjustable therein, means for adjustably supporting said guides on said fixtures, a brush, a carrier for the brush mounted on said guides and reciprocable in the slots therein, and means for reciprocating the brush carrier.

5. In a machine of the type specified, the combination comprising spaced upright side supports, a set of spaced adjusting screws on each side of said supports, means for arranging the screws whereby they will turn on the side supports without endwise movement, guides mounted upon each of said sets of screws and through which guides the threaded bodies of the screws extend, a brush, a brush carrier interposed between said guides and connecting therewith to be slidable thereon, cranks mounted to turn respectively upon said side supports, link connections between said cranks and the opposite ends of said brush carrier whereby the carrier may be reciprocated on said guides as the cranks are turned, means connecting said crank and link connections respectively whereby they may operate in unison upon an application of power to one of said cranks, and means for applying power to one of said cranks.

CHARLES G. SANDER.